United States Patent [19]
Zalewski

[11] 3,945,660
[45] Mar. 23, 1976

[54] STRUCTURE FOR FOLDING SHOPPING CARTS, LAUNDRY CARTS AND THE LIKE

[76] Inventor: Michel Zalewski, 12 W. 72nd St., New York, N.Y. 10023

[22] Filed: May 16, 1975

[21] Appl. No.: 578,229

[52] U.S. Cl. .............................. 280/42; 211/178 R
[51] Int. Cl.² ...................................... B62B 11/00
[58] Field of Search............. 280/42, 39; 211/178 R

[56] References Cited
UNITED STATES PATENTS

| | | | |
|---|---|---|---|
| 2,421,751 | 6/1947 | Giordano | 280/42 |
| 2,434,998 | 1/1948 | Goldman | 280/42 |
| 3,390,893 | 7/1968 | MacLaren | 280/39 |
| 3,722,905 | 3/1973 | Solomon | 280/39 |
| 3,836,164 | 9/1974 | Sugino et al. | 280/42 |

Primary Examiner—Robert R. Song
Attorney, Agent, or Firm—Ladas, Parry, Von Gehr, Goldsmith & Deschamps

[57] ABSTRACT

A folding shopping cart, laundry cart or the like in which a generally box-shaped fabric sack serves as an essential structural integer for holding two rigid generally horizontal upper side members of the cart in parallel relationship a given distance apart against forces developed upon unfolding the cart which would otherwise spread the upper side members further apart. The back and the bottom of the cart have respective cross frames of centrally pivoted rigid members, while the front of the cart has a parallel spaced pair of rigid vertical side members. The cart is locked into its unfolded condition by a knuckle-jointed cross brace between the lower ends of back cross frame. The rigid members of the cart are so interconnected that the cart folds into a stick-like bundle which includes wheels provided at the four corners of the bottom cross frame and a pair of rigid handle members articulated to the rear ends of the upper side members.

9 Claims, 6 Drawing Figures

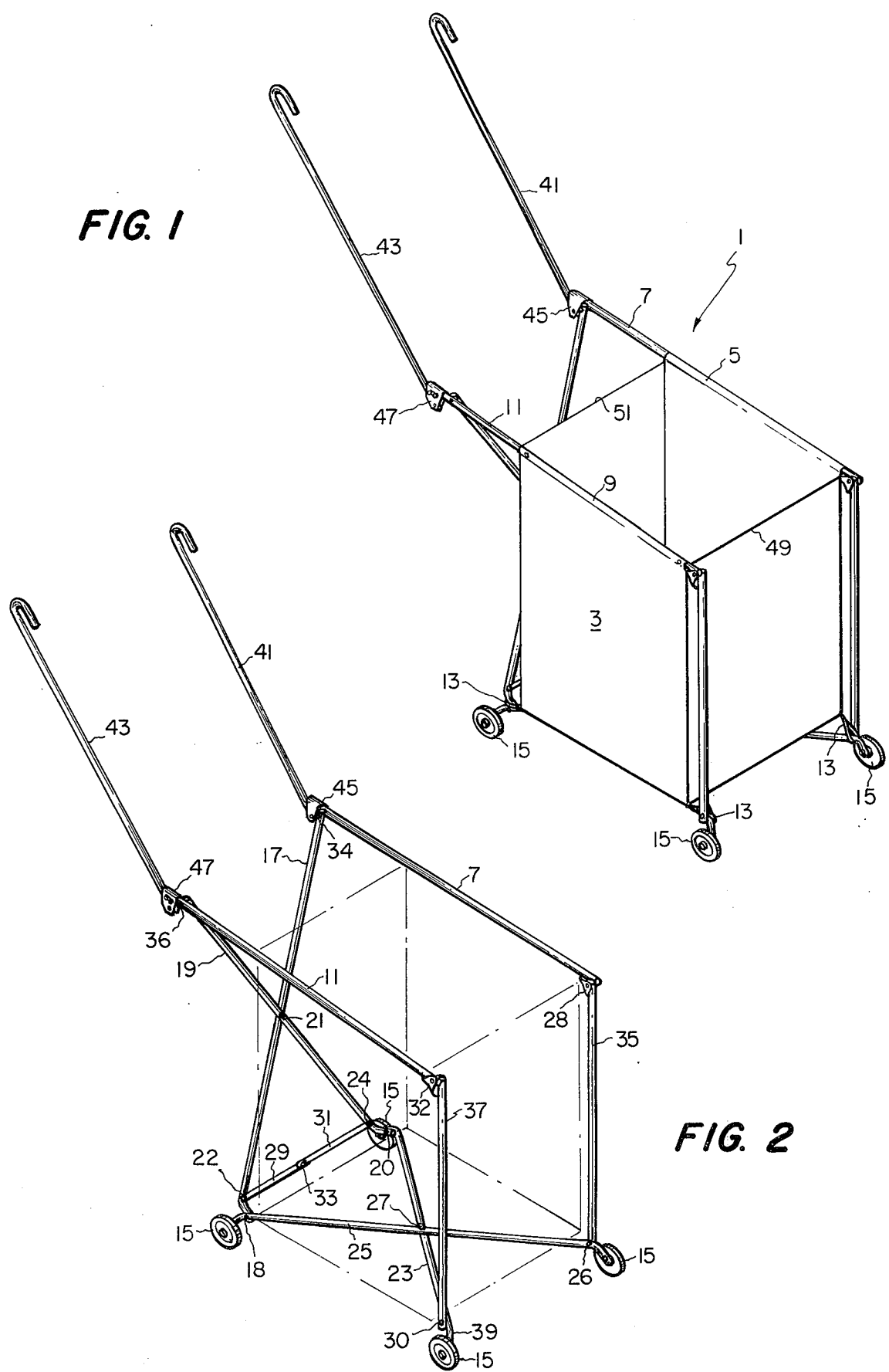

STRUCTURE FOR FOLDING SHOPPING CARTS, LAUNDRY CARTS AND THE LIKE

BACKGROUND OF THE INVENTION

This invention relates generally to a structure for folding shopping carts, folding laundry carts and the like, and more particularly to improvements in such a structure which render it "stick folding" into a stick-like bundle as distinguished from "flat folding" into a substantially two-dimensional rectangular configuration.

A "stick-folding" structure for a baby stroller has been disclosed in U.S. Pat. No. 3,390,893. This known structure employs a bottom cross frame of interpivoted rigid tubular members, a back cross frame of interpivoted rigid tubular members and two-axes pivot joint attaching one of each of the rear corners of the bottom frame members to one of each of the lower corners of the back frame members. The members of each cross frame pivot with respect to each other, and the cross frames themselves pivot with respect to each other, whereby folding of either cross frame necessarily causes the other cross frame to fold. Two knuckle-jointed tubular side braces are pivotally attached to the front corners, respectively, of the bottom cross frames and to the upper corners, respectively, of the back gross frame, and a knuckle-jointed cross brace connects the lower corners of the back cross frame to one another. Two side bars, pivotally connected to the lower corners of the back cross frame and to the side braces, project beyond the side braces for supporting the lower portion of a fabric bucket-like child's seat hung at its upper edge on a cord attached to the side braces. When the structure is folded, the collapsed cross frames overlie each other and extend longitudinally between the side braces.

SUMMARY OF THE INVENTION

In the structure according to the present invention, a bottom cross frame, back cross frame and knuckle-jointed cross brace are arranged and interconnected similarly to those of the known structure. However, the diagonally running side braces and diagonally running side bars of the known structure are eliminated, and instead two vertical front members are pivotally connected, respectively, at their lower ends to the front ends of the bottom cross frame, while two generally horizontal upper side members are pivotally connected, respectively, at their rear ends to the upper ends of the back cross frame and at their slightly lower front ends to the upper ends of the vertical front members. The structure according to the invention moreover uses a generally box-shaped fabric shopping sack, laundry sack or the like as an essential element of the structure, i.e. it is not merely suspended from and carried by the rigid elements of the structure, but augments the rigidity given by the rigid elements to the structure and holds the structure in its desired box-like shape when the structure is unfolded. In this respect, the upper lateral front and rear edges of the sack are under tension between the upper side members.

An object of the invention is, therefore, to provide an improved folding shopping cart, folding laundry cart or the like, the structure of which is "stick folding" into a stick-like bundle.

A further object is to provide an improved shopping cart, laundry cart or similar cart including a box-shaped sack, the cart being foldable into a stick-like bundle and deriving an essential part of its rigidity in its unfolded operational state from tensile forces exerted by the sack.

These and still further objects, advantages and features of the invention will be apparent from the following description of the preferred embodiments with reference to the accompanying drawings.

BRIEF DESCRIPTION OF THE DRAWINGS

FIG. 1 is an isometric view of a shopping cart embodying the present invention;

FIG. 2 shows the shopping cart of FIG. 1 in a similar isometric view, but with the box-shaped sack outlined in phantom;

DESCRIPTION OF THE PREFERRED EMBODIMENT

Figure 3:
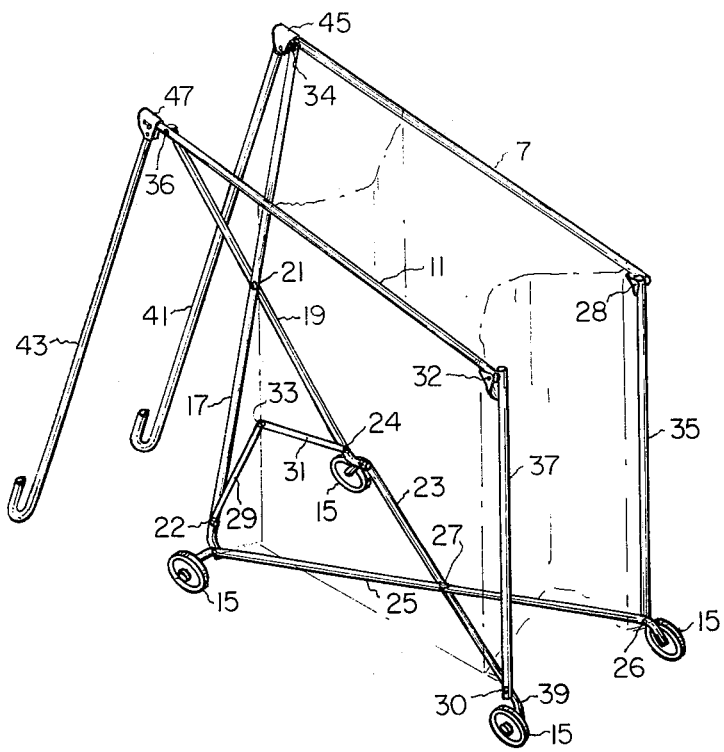
FIG. 3 is similar to FIG. 2, except for showing the shopping cart in a partially folded condition.

Referring in particular to FIGS. 1 to 3, it will be seen that the shopping cart 1 comprises a box-shaped sack 3, preferably made of nylon, whose upper left edge 5 is wrapped around and secured, as by sewing and rivets, to the upper side member 7 and whose upper right edge 9 is wrapped around and secured, as by sewing and rivets, to the other upper side member 11 parallel to side member 7. Each of the four bottom corners of sack 3 has an elastic loop 13 which slips over an adjacent wheel 15 and resiliently holds the corner at a region close to the inner face of the wheel.

The back cross frame of cart 1 is formed by two rigid tubular members 17 and 19 of equal length pivtoally connected midway between their ends by a pin 21, while the bottom cross frame is formed by two rigid tubular members 23 and 25 of equal length pivotally interconnected midway between their ends by a pin 27. Pins 18 and 20 pivotally connect the lower ends of members 17 and 19 to the rear ends of members 25 and 23, respectively. The knuckle-jointed cross brace which connects the lower ends of members 17 and 19 to one another is formed by two rigid strap members 29, 31 and a 180° knuckle-joint 33 connecting their inner ends. Suitable pivot pins 22, 24 connect the outer ends of strap members 29, 31 to the respective lower ends of tubular members 17, 19 at points just above where these lower ends start to bend forwardly, the forwardly directed bends creating space for accommodating sack 3 when structure 1 is folded. The final operation in the unfolding of cart 1 is the placing of strap members 29, 31 in substantial alignment with one another by pushing their inner ends down until 180° knuckle-joint 33 prevents further movement and effectively locks the cart in the fully unfolded condition shown in FIGS. 1 and 2.

The rigid tubular vertical front member 35 is pivotally connected by a pin 26 at its lower end to the front end of the bottom cross frame member 25 and by a 270° knuckle-joint 28 at its upper end to the front end of upper side member 7, while the other vertical front member 37 is pivotally connected by a pin 30 at its lower end to the front end of the bottom cross frame member 23 and by a 270° knuckle-joint 32 at its upper end to the front end of upper side member 11. Knuckle joints 28 and 32 permit their respective members 7, 35 and 11, 37 to pivot relatively to one another no more than 270° and ensure that members 35 and 37 are held vertically when structure 1 is unfolded. The wheels 15 are carried by short downwardly curved portions 39 extending beyond the pivots at the ends of the bottom cross frame members 23, 25. Elastic loops 13 at the four lower corners of sack 3 encircle portions 39.

Rigid tubular handle members 41, 43 are pivotally connected by 240° knuckle joints 45, 47 to portions of upper side members 7, 11 which extend slightly beyond pivotal connections 34, 36 of upper side members 7, 11 to the back cross frame members 17, 19. Each 240° knuckle joint 45 or 47 is operable to lock its respective handle in the upwardly extending position of normal use shown in FIGS. 1 and 2 and to unlock the handle from that position and permit it to be swung through the intermediate positions shown in FIGS. 3 and 4 to a final position alongside its associated upper side member, as shown in FIG. 5.

Figure 4:
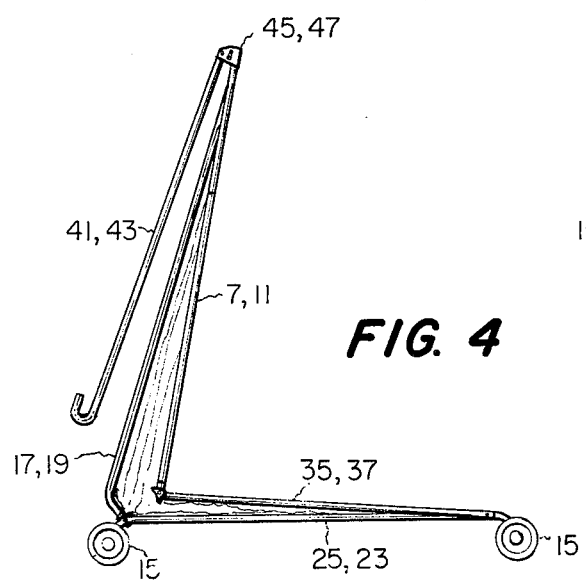
FIGS. 4 and 5 are front elevational views of one of the two folding trapezoidal sub-structures of the shopping cart of FIG. 1 at an advances stage of folding and at the completed stage thereof, respectively.

The pivotally interconnected tubular members 7, 35, 25 and 17, in the fully unfolded state of structure 1, form one generally quadrilateral sub-structure while the pivotally interconnected tubular members 11, 37, 23 and 19 form a second generally quadrilateral substructure. FIG. 4 shows how either one of these substructures looks when cart 1 is semi-folded; FIG. 5 shows how either one looks when the cart is fully folded; and FIG. 6 shows how both sub-structures lie side-by-side when the cart is fully folded and thereby provide the cart with its characteristic "stick folding" into a stick-like bundle. An important factor in making such folding possible, of course, is the dimensional relationships of the tubular members in each sub-structure. Thus, the length of member 7 is to that of member 17 as the length of member 35 is to that of member 25. Similarly, the length of member 11 is to that of member 19 as the length of member 37 is to that of member 23. For this purpose, the lengths of the members are reckoned between the pins at their ends.

Due to stress developed at the lower pivotal pin connections 26, 30 of vertical front members 35, 37 and at the upper pivotal pin connections 34, 36 of back cross frame members 17, 19 when cart 1 is locked in its unfolded condition by strap members 29, 31 of the knuckle-jointed cross brace, there is an urging apart of upper side members 7, 11 which is overcome by the upper lateral front and rear edges 49, 51 of sack 3 being placed under tension. Thus, sack 3 does more than merely carry grocieries, laundry and the like; it exerts tensile forces which hold cart 1 in its proper fully unfolded shape.

Figure 5:
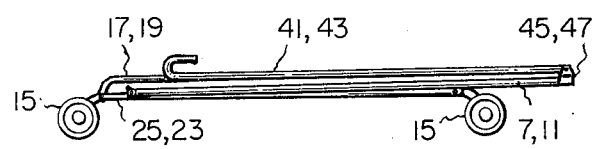
Figure 6:
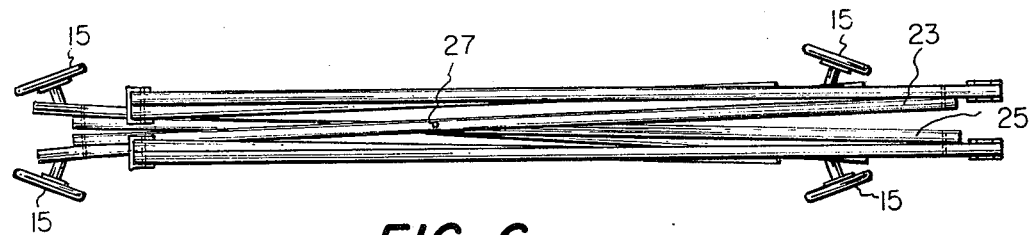
FIG. 6 is a top elevational view of a fully folded shopping cart according to FIG. 1 with the sack and handle members removed to show more clearly the orientation of the principal rigid components.

To fold the cart from the condition of FIGS. 1 and 2 to that of FIGS. 5 and 6, the user moves the 180° knuckle joint 33 upwardly from its locking position. As will be appreciated from FIG. 3, this unlocking movement automatically causes the centrally pivoted members 17, 19 of the back cross frame to scissor together as well as the centrally pivoted members 23, 25 of the bottom cross frame. If, at this stage of the cart folding procedure, the front and rear portions of sack 3 do not naturally fold inwardly toward each other as indicated in phantom outline in FIG. 3, such folding should be assisted by the user.

The user then pushes the 270° knuckle joints 28, 32 toward the rear wheels 15, which causes the upper side members 7, 11 and vertical front members 35, 37 to move to the partially folded positions shown in FIG. 4 simultaneously with movement of the back cross frame members 17, 19 toward the bottom cross frame members 23, 25. Before or after this step, as convenient, the 240° knuckle joints 45, 47 are operated to their unlocked state and the handle members 41, 43 are swung downwardly. The folding procedure is then completed by bringing all of the rigid members into the generally parallel relationship indicated in FIGS. 5 and 6, whereby the folded cart is a stick-like bundle.

Modifications of cart 1 clearly within the scope of the appended claims will occur to those skilled in the art and it is not intended to limit the invention to the specific form thereof illustrated and described herein.

What is claimed is:

1. In a folding cart assembly having a back cross frame of centrally pivoted rigid members, a bottom cross frame of centrally pivoted rigid members, pivotal connection means attaching one of each of the bottom frame members to one of each of the back frame members at each of two corners of said cross frames to permit the members of each cross frame to pivot with respect to each other and to permit said cross frames to pivot with respect to each other, and releasable means for holding the members of at least one of the cross frames in an extended position when the assembly is unfolded, the improvement comprising:
   a. a first pair of members pivotally attached at first ends thereof to the bottom cross frame near the other two corners of the bottom cross frame, respectively;
   b. a second pair of members pivotally attached at first ends thereof to the back cross frame near the other two corners of the back cross frame, respectively;
   c. two 270° knuckle joints, each connecting a second end of one of said first pair of members to a second end of one of said second pair of members, for holding the first pair of members in a vertical position and the second pair of members in a generally horizontal position when the assembly is unfolded and said at least one of the cross frames is held in an extended position by said releasable means; and,
   d. a generally box-shaped fabric sack open at the top thereof and fixedly attached along its opposed upper side edges to said second pair of members for holding said second pair of members in parallel relationship with predetermined spacing therebetween against forces urging them apart which are developed in the assembly when it is unfolded with said at least one of the cross frames in said extended position.

2. The improvement according to claim 1, wherein each interconnected pair of members of said first and second pairs of members which are connected by one of said 270° knuckle joints forms with its associated members of the back and bottom cross frames a generally quadrilateral substructure.

3. The improvement according to claim 2, wherein the members of each quadrilateral substructure are so related that the ratio of the length of each member of said first pair to that of its associated member of the bottom cross frame is equal to the ratio of the length of each member of said second pair to that of its associated member of the back cross frame, said lengths being taken between the pivotal connections at opposite ends of said members.

4. The improvement according to claim 1, wherein four wheel sets are provided, one at each corner of the bottom cross frame.

5. The improvement according to claim 4, wherein each wheel set is carried by a short downwardly curved portion extending beyond the pivot at a respective end of a respective member of the bottom cross frame.

6. The improvement according to claim 5, wherein said sack has four bottom corners, each connected to a respective said downwardly curved portion by an elastic loop.

7. The improvement according to claim 1, wherein each of the second pair of members has a handle member articulated thereto at its rear end by a respective knuckle joint operable to lock the handle member in a rearwards upwardly extending position and to release said handle member for folding alongside the members of said back cross frame.

8. The improvement according to claim 1, wherein said first and second pairs of members, as well as the members of said back and bottom cross frames, are of rigid tubular metallic construction.

9. The improvement according to claim 1, wherein the pivotal attachments at said first ends of said first and second pairs of members are pin connections at which the urging-apart forces are developed, the front and rear edges of said sack being under tension while said second pair of members are held in their parallel predetermined spaced relationship by said sack.

* * * * *